MAGNETIC PLATING CELL

Filed May 10, 1967 2 Sheets-Sheet 1

INVENTORS
PETER P. SEMIENKO
EMIL TOLEDO
BY John J. McCormack
ATTORNEY

July 13, 1971 P. P. SEMIENKO ET AL 3,592,753

MAGNETIC PLATING CELL

Filed May 10, 1967 2 Sheets-Sheet 2

INVENTORS
PETER P. SEMIENKO
EMIL TOLEDO
BY
John J. McCormick
ATTORNEY

United States Patent Office 3,592,753 Patented July 13, 1971

3,592,753

MAGNETIC PLATING CELL

Peter P. Semienko, Roslindale, and Emil Toledo, Brighton, Mass., assignors to Honeywell Inc., Minneapolis, Minn.

Filed May 10, 1967, Ser. No. 637,482
Int. Cl. C23b *5/58;* B01k *3/00*
U.S. Cl. 204—206 11 Claims

ABSTRACT OF THE DISCLOSURE

A perforated sleeve structure adapted to uniformly distribute the flow of magnetic plating electrolyte past a wire substrate according to a prescribed uniform, substantially-transverse agitation mode along the plating length of the continuously-moving wire so that a thin magnetic film may be plated thereon under high current density/high agitation conditions; this being especially adapted for plating Permalloy memory films having prescribed, carefully controlled, magnetic properties including "near-zero" magnetostriction.

PROBLEMS, INVENTION FEATURES

Figure 1:
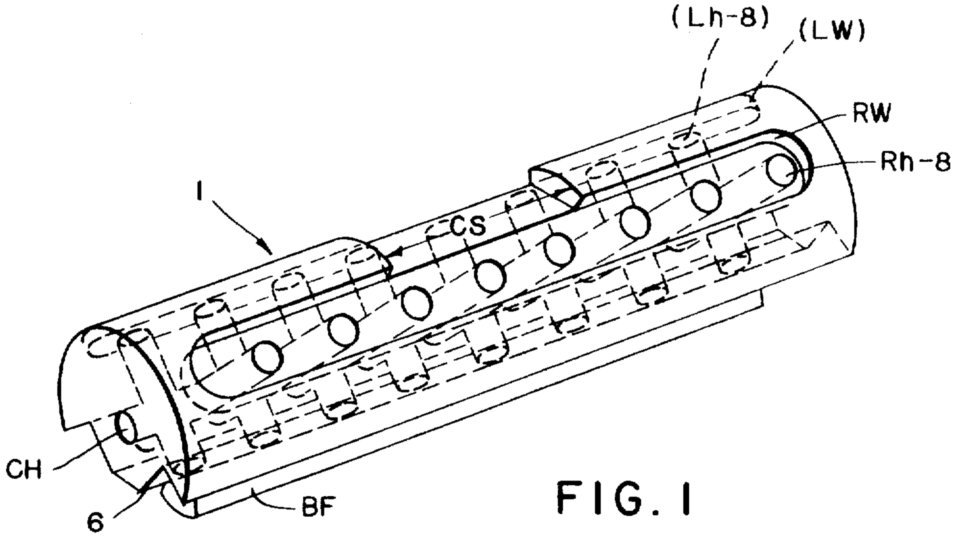

Magnetic wire memories are currently of high interest in the data storage field especially for electronic data processing applications. They commonly comprise a thin conductive wire on which is coated a (magnetic memory) thin film, such as by electroplating continuously. Workers in the art today recognize that the very fussy magnetic properties inherent in a good wire memory film, together with the formidable difficulties in plating any thin magnetic film, make the fabrication of such wire memories a very exacting task. Workers in the art try to continuously electro-deposit such films very rapidly, as is necessary for efficient, "production-quantity" film deposition. But a high "production-throughput" requires high plating current densities which, in turn, require "high agitation" conditions, e.g. to assure maintaining a very precise uniformity of alloy composition under these extreme plating circumstances. It will be recognized that these somewhat diverse constraints, though necessary, are very difficult to satisfy. However, it is undeniably all-important for the typical memory film to be plated to a very, very uniform composition; else the necessary precise uniformity of magnetic characteristics will be lost. This invention provides a magnetic-plating cell adapted to provide such uniformity in the face of extreme plating circumstances like those aforementioned.

Given a proper wire substrate, workers in the art have attempted to electroplate a thin (e.g. 1 micron or so) magnetic film thereon, such as a magnetic nickel-iron (Permalloy). Often, sulfate/chloride and sulfamate electrolytes have been used for this. It has been found that, with the high current density/high agitation conditions necessary for a "production" type plating set-up, the composition of the plated magnetic alloy is a very sensitive function of the mode of electrolyte agitation adjacent the wire surface. For such cases, the plating chamber (cell) must be designed to give uniformly high agitation along the entire "plating-length" of a (passing) wire substrate in order to minimize the possibility of even slight variations in plated film composition along the wire. Typically, the electrolyte should be pumped (or otherwise urged) into such a cell to impinge against the surface of the moving wire substrate at a relatively high velocity and thereafter exit through low impedance exit-ports at either end of the cell.

It is known that for very many magnetic memory applications, it is very important to maintain a "near-zero" magnetostriction plated alloy composition. The stresses in a deposited film can severely degrade storage properties if this "near-zero" magnetostriction is not maintained precisely. This problem is even more severe for (flexible) wire substrates which are commonly bent and twisted (stressed) during handling. Thus, it has been found that the average composition of such a thin film wire memory should be held to within about ±0.2% of a nominal "zero magnetostriction" composition to avoid difficulties such as "strain-induced skew" from handling during assembly of the memory device and the like. Even apart from such external stress, it has been found that an increase in "dispersion" of the film (in an unstressed wire), resulting from internal stresses in the film, occurs when the film composition deviates from the "zero magnetostriction" composition by more than about ±1%. Thus, workers in the art understand the critical importance of maintaining a uniform prescribed alloy when plating a memory film, such as by controlling the bulk bath composition, temperature, pH, agitation, flow, oxidation and plating current density.

Electrolyte agitation, as aforesaid, can radically affect the composition of a plated memory film, at least partly because of its effect upon the thickness and the composition of the so-called "depletion layer," i.e. the portion of electrolyte immediately surrounding a wire (this being, in general, not necessarily identical in composition to the "bulk composition" of the electrolyte). Given a constant plating cell geometry and other factors, agitation (and resultant plated alloy composition) will vary with the electrolyte flow mode (including flow rate). It may thus be expected that changing the cell geometry will change this flow and, in turn, vary the plated alloy composition. For instance, it will be found that an increase in Fe content of a plated Ni/Fe film will occur with an increased flow rate and increased agitation, evidently because of decreasing depletion layer thickness causing an increase in the deposition rate of the more-readily deposited Fe. The invention provides a cell structure for controlling such agitation and associated effects.

Thus, it is an object of the present invention to provide such a plating cell structure adapted for the described plating purposes and to overcome the aforementioned difficulties. More particularly, an object of the invention is to provide such a cell for "fast" (i.e. high C.D., high agitation) conditions in the form of a hollow "wire-surrounding" sleeve having a number of rows of transverse aligned bores, each bore being identical and drilled through the cell cross-section transverse the wire length, the bore array being adapted to conduct recirculating charged electrolyte transversely against the wire so as to make the plating action uniform along the sleeve. A more particular object is to provide a plurality of such bore rows whereby the bores are disposed along the sleeve in a staggered symmetrical pattern. Yet another object is to provide such bores of a prescribed range of diameters. A more particular object is to provide such a sleeve having the bore diameters selected to provide circumferential agitation (about the wire) substantially continuously and uniformly along the plating distance. Still another object is to provide such a sleeve having a center-hole diameter which closely approximates the bore diameter. Still another object is to provide such a sleeve having such side bore and center-hole diameters in a prescribed dimension range and a prescribed ratio, close to 1:1. Still another object is to provide such bores having a prescribed separation gap along the sleeve length, only sufficient to provide uniform circumferential agitation.

Yet a further object is to provide a Ni-Fe plating cell having such bores with a diameter just large enough to sufficiently dissipate the "depletion layer" and to avoid blockage (such as by detritus particles); yet not large enough to increase the flow rate sufficient to favor Fe deposition. Yet a further object is to provide such a cell with center-hole diameter of from about 0.9 to about 1.1 that of such bores. Still another object is to provide such a center hole diameter large enough to provide sufficient uniform flow of the viscous electrolyte for uniform alloy composition uniformity; while yet being small enough to provide "laminar" (non-turbulent) agitation flow and also to prevent a heated "diffusion film" and resultant plating problems at the expected high current densities. A still further object is to provide such bores and a center-hole constructed to induce a laminar unirotational circumferential flow about the passing wire substrate.

To electro-plate the aforementioned cylindrical magnetic films, and more especially Permalloy wire Memory films, with "near-zero" magnetostriction, the invention provides a plating cell structure adapted to induce very uniform electrolyte agitation transverse the cylindrical substrate, especially to eliminate any substantial longitudinal or other interfering agitation and thus prevent even slight variance in plated composition along the substrate. Such variances are often found in prior art plated films and are caused by the build-up of the aforedescribed depletion layer which is practically eliminated with the present improved cell. More particularly, for plating such films under high agitation conditions, the cell of the invention creates a circumferentially-balanced, unidirectional agitation flow which is also substantially uniform and continuous along the plating distance.

Figure 2:
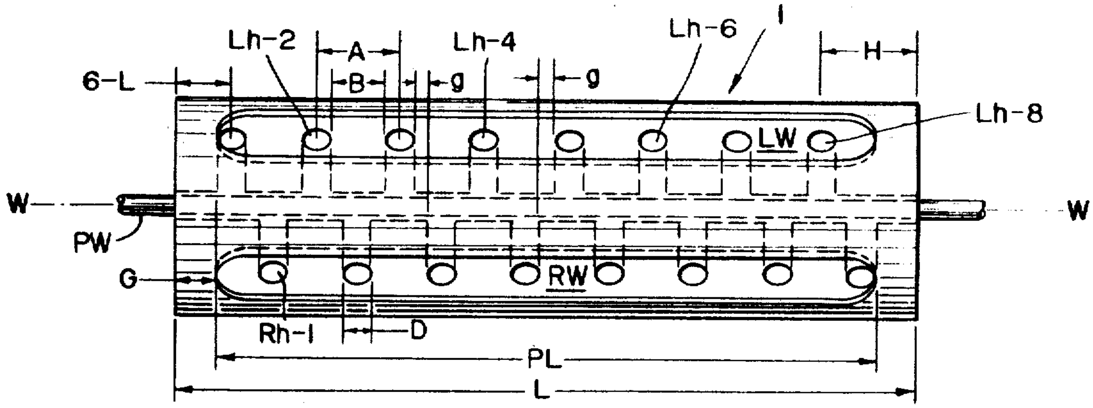
Figure 5:
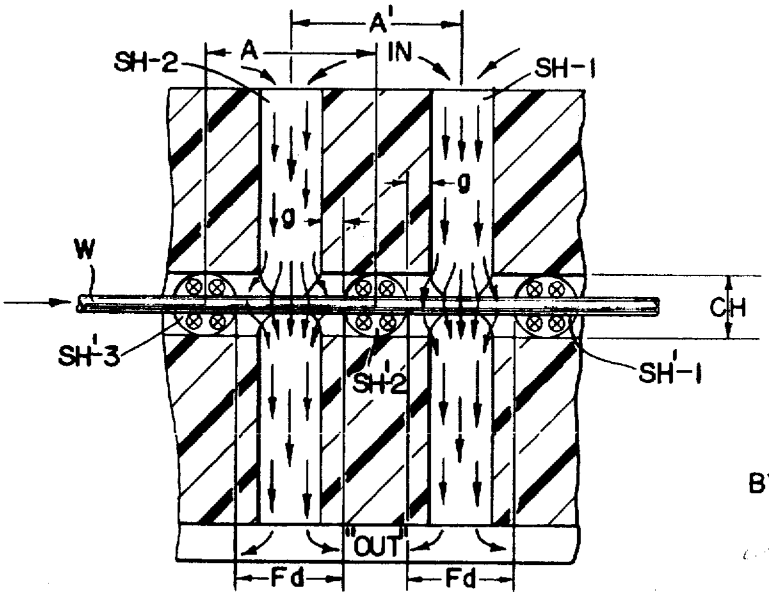
Figure 3:
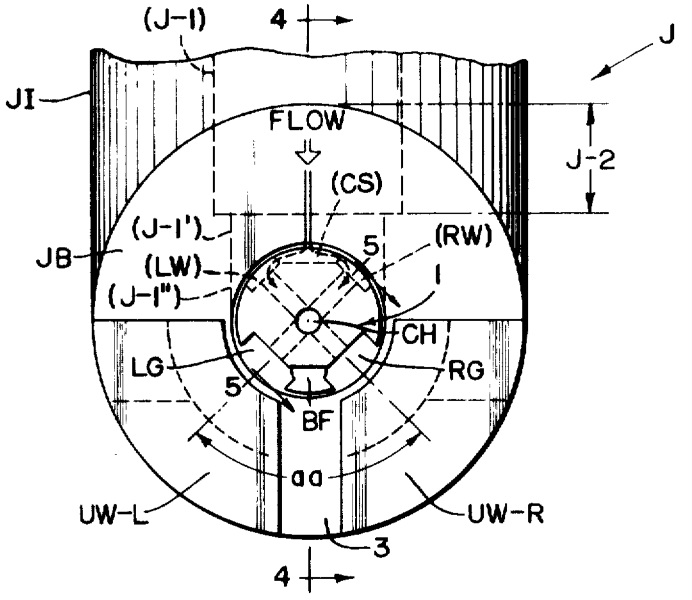
Figure 4:
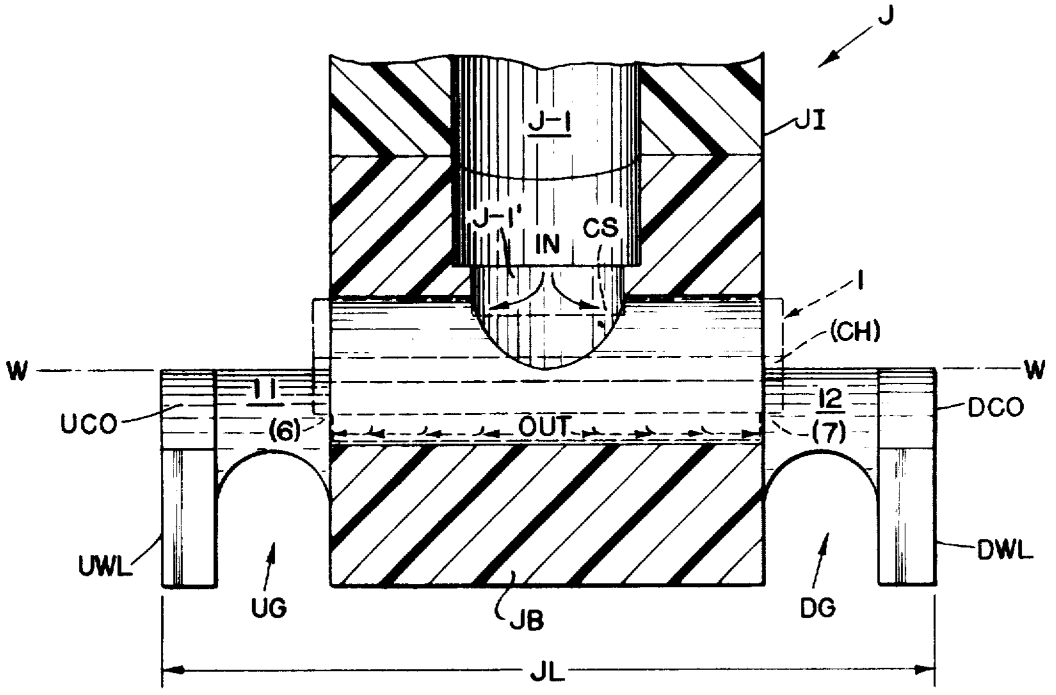

Other objects and features of the invention will be apparent to those in consideration of the following specification in conjunction with the following relevant drawings, wherein like numerals denote like parts:

FIG. 1, an isometric (upper, oblique) schematic view of a plating cell constructed according to the invention;

FIG. 2, a top (plan) view of the cell in FIG. 1;

FIG. 3, an end view of the cell in FIGS. 1 and 2, as arranged inside a jacket structure for directing plating electrolyte down onto the cell and subsequently directing it away from the (ends of) the cell for recirculation;

FIG. 4, a side section through the jacket in FIG. 3 along lines IV—IV, with the cell profile indicated in phantom; and FIG. 5, a very schematic, fragmentary section through a portion of the cell along lines V—V of FIG. 3.

FIGS. 1 through 4 show a plating cell structure 1 generally adapted to be immersed in electrolyte to distribute recirculated electrolyte onto a wire substrate within so as to control electroplating thereto. As seen below, cell 1 directs electrolyte against a continuously moving substrate wire PW inducing a prescribed, carefully-controlled agitation (e.g. down each of a number of bores "*h*," as indicated by the arrows in FIGS. 3, 5). Wire PW will be understood as translated along central cell axis W—W, as known in the art. Such a wire may comprise a Be-Cu wire of a few mils diameter, copper-plated to provide this substrate. Desirable techniques for providing such a copper plate and for surface treating the wire substrate, before and after copper plating, are described in the copending, commonly-assigned patent applications: Ser. No. 518,013, "Metal Treatment" and Ser. No. 518,184, "Improved Copper Plating" and now Pat. No. 3,506,546. The magnetic plating electrolyte and other conditions in which cell 1 is adapted to be preferably used are indicated below, being summarized in bath A and Tables I, II. Equivalent conditions may occur to those skilled in the art. For instance, like plating conditions are described in copending, commonly assigned patent applications, Ser. No. 606,555, "Plated Memory Film and Associated Method" and now abandoned and Ser. No. 517,944, "Electroplating Bath and Method" now Pat. No. 3,489,660.

The details of bath A (and in Table II) and the plating conditions in Table I are believed to be self-explanatory, however, it will be appreciated that, in general, these plating conditions constitute a high current density, high agitation environment. As to the degree of agitation, it will be understood that a flow rate will be maintained which is just sufficient to prevent any appreciable depletion layer from building up around the wire substrate, but little more, since an increase in flow rate can favor Fe deposition to a great extent thereby preventing consistent plating of the desired plated alloy composition. Regarding the indicated construction of the plating cell 1 and associated jacket J (summarized in Table II), it will be appreciated that, as with the rest of the exemplary details illustrated and described, these details are primarily propaedeutic and not limiting.

Cell 1 is generally indicated as a relatively cylindrical, hollow structure, made of a non-conductor, preferably Teflon, which is inert, durable, etc. in the plating environment. Cell 1 has a central bore (center hole) CH extending along its length to coaxially surround wire PW. Hole CH has a carefully prescribed, uniform diameter which is related, as seen below, to other plating parameters, such as wire diameter, side bore diameter, flow rate, wire speed, etc.; this diameter preferably being about 36±3 mils (see Table III) given the conditions of Bath A and Tables I, II (below). Cell 1 also has two (orthogonal) sets of side-bores (R*h*, L*h*) of about the same diameter as CH (discussed below). Cell 1 will be understood as having a basal "spine" BF and pairs of upper and lower cutouts RW, LW and RG, LG, respectively, disposed symmetrically and opposingly about axis W—W. Lower cut-outs LG, RG (see also FIG. 3) comprise identical left and right channels respectively cut about 90° apart (angle aa) and in parallel along the length of cell 1 along its lower periphery. Grooves RG, LG will be seen as arranged to provide egress of electrolyte (outward from the center of cell 1 toward its ends) emanating from the bottom ends of side bores R*h*, L*h*. A pair of "well" cut-outs RW, LW communicate through a cross-cut-out CS (of about the same relative depth and central thereof) and comprise right and left "wells" respectively, one for each row of side bores. Wells RW, LW are adapted to distribute electrolyte injected from jacket J relatively evenly into associated perforations R*h*, L*h*, respectively. The dimensions of cell 1 and of these cut-outs, bores, etc. and the dimensions of jacket J are summarized in Table III below. For a particular range of embodiments useable under plating circumstances indicated below (cf. Baths A and in Table II).

TABLE I.—PLATING CONDITIONS

Substrate: Be-Cu core, plated, to about 5 mil (range 3.5–7.0) diameter with copper, having prescribed roughened, (black caviar) polished surface—pulled through cell from about 4–10 in./min. speed;

Magnetic film required: "near-zero" magnetostriction for "DRO"-type magnetic storage (memory film) of approx. 80 Ni/20 Fe Permalloy, having magnetic properties of: $H_c \approx 1.4$ oe., $H_k \approx 2$–4 oe., skew$<\frac{1}{2}°$, dispersion$<3°$; electroplated to about 1.0 micron (range 0.7–1.5);

Electrolyte: (cell 1 immersed in) preferably "complexed," multi-nickel source materials Permalloy type, such as bath A or as described in applicants' copending commonly assigned applications, S.N. 606,555; or S.N. 517,944;

Current density: very high, from 300 a.s.f. range to 750 a.s.f.; acc. to wire speed: between about 4–10 in./min., respectively.

Agitation: very high, though substantially entirely (split-flow) circumferential and uniform along plating length (LP); with high pressure, flow rate—injected (through tube JI) at about 500 ml./min. (range 400–550 ml./min.); no more than just necessary to dissipate "depletion layer."

Yield: Less than about 10% not acceptable.

Bath A is described below and adapted for use with the wire substrate of the type aforedescribed and so prepared. Such wire is unspooled to be continually advanced through a magnetic plating station including the electrolyte and conditions enumerated. Bath A is adapted to plate the aforedescribed thin magnetic Permalloy film about 1¼ microns thick. This magnetic plating station can be placed, in-line, downstream of "wire-preparing" stations (such as the electropolishing station, etc.). The copper-surfaced wire, as treated, will be presumed to have a 5 mil (±0.5) diameter and to be advanced continuously at about 4 inches/minute. It will be presumed that besides the plating constraints described below, the electroplating will be otherwise conducted as known by those skilled in the art. It is preferred to use a soluble, pure-nickel anode.

BATH A

| | Representative (gm./l.) | Optimum range (gm./l.) |
|---|---|---|
| Nickel chloride | 750 | 500–1,200 |
| Nickel sulfate | 1,000 | 500–1,200 |
| Nickel ammonium sulfate | 1,000 | 900–1,100 |
| Boric acid | 450 | 450 |
| Saccharin | 33 | 20–40 |
| Sodium laurel sulfate | 0.25 | [1] .2–.3 |
| Water (distilled), liters | 6.5 | [1] 6–7 |
| Ferrous ammonium sulfate | e.g. 70–90 (for zero magnetostriction at this T° etc.). | |
| Temperature (° C.) | 69–71 | 69–71 |
| pH | 2.6–2.8 | 2.1–2.8 |
| Plating time | 4.3"/min. wire speed for 1¼ microns plating in a cell 1 inch long (9.6 in./min. for 1 micron.) | |
| Specific gravity | 1.195 | ---- |
| Typical ion concentration, g./l.: | | |
| Ni | 78 | ---- |
| Fe | 1.6 | ---- |

[1] Approximate.

NOTE.—Using nickel anode (300–400 a.s.f.—5 mil x 1 in. anode at 35–42 m.s.) (700 a.s.f. for 9.6"/min. speed).

The magnetic plating solution is prepared by adding 500 grams of $Ni(NH_4)_2SO_4.6H_2O$ to 225 grams of boric acid in 1,500 ml. of water at 70° C. Two such portions are required per solution. Next, 1,000 grams of nickel sulfate, 750 grams of nickel chloride and 23 grams of saccharin are added to two liters of water at 70° to 80° C. When these three portions are completely dissolved, they are mixed in a 5 gallon polyethylene container. The required iron portion is then dissolved rapidly in about 1,400 ml. of cold (20° C. max.) water and poured into the remainder of the solution. Unless the ferrous iron is added in just this manner, and rather quickly, there is danger of poisoning the solution (by oxidation to ferric iron). Sodium laural sulfate is added when plating Permalloy.

TABLE II

| Baths | B–1 | B–2 | B–3 | B–4 | B–5 | B–6 |
|---|---|---|---|---|---|---|
| Nickel chloride | 1,000 | 500 | 600 | 600 | 700 | 1,400 |
| Nickel sulfate | 1,000 | 1,200 | 1,200 | 750 | 1,000 | 0 |
| Nickel ammonium sulfate | 1,000 | 1,000 | 1,000 | 900 | 1,000 | 1,000 |

Baths B–2 and B–6 will be observed to have slightly inferior magnetic properties (e.g. dispersion and magnetic output) for DRO wire applications and a somewhat lower plating yield (about one-half).

In accordance with the aforementioned objectives, it was found that the foregoing continuous plating processes with baths A, B–1, etc., yielded a magnetic plated film in accordance with the described desirable characteristics. That is, these "tri-nickel" electrolytes, being very conveniently prepared with "reagent grade" nickel sulfate and nickel chloride, gave completely reproduceable characteristics if mixed, as indicated. More especially, they gave a more stable alloy plating, had a higher metal ion concentration, and produced superior quality wire on the substrate, as well as giving good yields. It will be remembered that these two materials can be procured in "AR Grade" qualities whereas some such prior art materials cannot, allowing one to, with these, better guarantee the reproduceability and reliability of plating. These two additives, in conjunction with the ammonium sulfate, also produce a more stable, longer-lived and non-precipitating electrolyte especially advantageous for continuous plating. For example, because they allow a much higher source ion (nickel) concentration (and, thus, a higher Fe concentration also when plating a particular alloy), they greatly improve stability without bath depletion. For instance, these materials have been observed to continuously plate up to ten hours where an analogous prior art sulfamate type bath is stable for only about one and one-half hours maximum under the same conditions.

We have found that a convenient formula for adding the aforementioned "tri-nickel" ion materials to the electrolyte is the following:

First: dissolve a maximum concentration of nickel ammonium sulfate in the aqueous electrolyte; that is, up to saturation concentration, consistent with stability; and Second: then add sufficient of both nickel chloride and nickel sulfate to, together, derive a prescribed maximum nickel ion concentration consistent with bath stability; these two being present in relative proportions in the range of about 2:1 to 1:2. While in some instances one nickel source ion might be eliminated, plating quality will usually suffer, for instance, leading to a lower recorded bit output and an inferior dispersion characteristic.

TABLE III.—CELL CONSTRUCTION (Cf. FIG. 2)

Materials: Cell 1 of Teflon; jacket J of Lucite, or the like.

Cell 1 measurements: Length L: 880 mils (range ⅞–1")
- plating length PL: approx. 800 mils;
- cell diameter: 250 mils (consistent with convenience of handling, deburring and hole drilling and to minimize manufacturing cost);

Cut-outs: (RG, LG, RW, LW)
- left and right grooves (LG, RG) both: 93 mils wide x 60 mils deep;
- end-notches 6, 7 in spine BF: 60 mils long x 60 mils deep;
- left and right wells (LW, RW) both: approx. 93 mils wide x 32 mils deep x approx. 800 mils long and about 40 mils (G) from ends with connecting cut CS about 250 mils long (centered along L).

Center-hole:
- diameter (CH): prefer 36 mils (±3); (range: 28–42; see Table IV) large enough to clear wire PW and allow an even flow of electrolyte, but not so large as to degrade laminar flow (such flow preventing an overheated "Diffusion film" from developing at the wire surface and interfering with good plating at high A.S.F.);

Side-bores: (2 or more sets, L*h*, R*h* uniformly staggered along PL):
- diameter (SH): prefer 36 mils (±3)—range 28–42; or .9 to 1.1 CH diam. (prefer 1.0)—see Table IV;
- spacing: uniformly along PL on 100 mil centers (A); 50 mils staggered (K) (I 10% tolerances); leaving gap *g* between successive alternate SH (e.g. L*h*–1 and R*h*–1) of 17 mils for 33 mil SH, CH (this varying according to SH size—see Table V) being only enough to compensate for "flare" of laminar flow, with neither interruption nor interference along PL.
- SH drilled uniform through diameter of cell 1 to be aligned along one side and about 90° (*aa*) offset from like holes on other side (see FIG. 3), leaving center of "near hole" about 65 mils from end of cell (7–L, 6–L); that of "far hole" about 115 mil.

Jacket J: of Lucite (acrylic resin, etc.)
- body JB: about 1" diam.; 1.4" long (JL);

with one pr. "wings," each end (upstream and downstream—VW, DW resp.) symmetrically arranged left and right (e.g. VW–L, VW–R, FIG. 3) spaced by gap 3 (about 1/8"), each being projected, on bridge-portions 11, 12, from the upstream and downstream ends of JB by uniform "tunnel" spacings (UG, DG respectively) about 250 mils; each wing end being about 166 mils thick (F).

connected to body JB is hollow inlet tube JI about .8" diam., 2–3" high and coupled to electrolyte-inlet (with Anode) and naving a central bore J–1 of about 375 mils diam., narrowed at J–1' to 250 mils (about 125 mils into body JB—distance J–2).

Upper and lower cut-outs are disposed in circumferentially-paired opposition (i.e. RW opposite LG and LW opposite RF) so that perforations *h* can extend (be bored) registeringly through cell 1 to communicate therebetween. Lower channels G extend the full length of cell 1, whereas upper wells W terminate, symmetrically, short of its ends, as indicated. Thus, well RW has a plurality of (eight) aligned, uniform-diameter, equally-spaced side-(conduit)-bores R*h*–1 through R*h*–8 drilled therein, to communicate registeringly at the opposite side of cell 1 with companion lower channel LG, as indicated in FIG. 3. Similarly, well LW has an array of eight like aligned side-bores L*h*–1 to L*h*–8 extending through cell 1 to communicate with channel RG. Bores R*h*, L*h* are disposed in uniformly staggered relation along the length of associated wells W as best indicated in FIG. 2. Over a plating length PL of about .8" (for this example), it has been found that a minimum of about eight side-holes SH in each set R*h*, L*h*, is necessary. Bore diameters in the range indicated in Table IV are useable. Bores smaller than this have been found susceptible to (ion) "depletion" at the wire and to blockage with sediment and the like, while bores substantially larger have upset the desired Ni–Fe (plated) composition, forming Fe deposition and making it practically impossible to maintain a small enough concentration of iron adjacent the wire substrate. More particularly, when merely six holes in this diameter range (about 28–42 mils) were provided along this plating length, the plating results were found to be entirely unsatisfactory for the aforedescribed (memory) purposes.

With reference to FIGS. 3 and 4 especially, workers in the art will understand that, in operation, cell 1 will be disposed inside a jacket J or the like for controlled directed injection and exit of the recirculated electrolyte. The jacketed cell will be immersed in the electrolyte in a vessel through which the wire is to be drawn, being customarily guided therewhile. Jacket J has a fluid inlet portion, such as hollow tube JI with a central bore J–1 communicating with fluid inlet means (e.g. from a recirculating pump and reservoir through conduits, as known in the art). Bore J–1 is adapted to project recirculating electrolyte normally against the top central portion of cell 1, relatively normally onto cross-cut CS, so that the fluid is forced down wells RW, LW and, thereafter, at a relatively even flow rate and pressure, down associated side-bores R*h*, L*h*. This will project the fluid against a (passing) wire substrate PW, relatively transverse of axis W—W within the central hole CH, along plating segment PL therewithin. This fluid will be circulated to flow smoothly and agitatingly, in a prescribed laminar manner (as hereinafter described), down each bore *h* and uni-circumferentially (split-stream) around intermediate wire PW (cf. FIG. 5). As this flow proceeds from the upper half of any given bore *h* (e.g. the "originating-half" of bore D–1 in FIG. 5) and crosses center-hole CH to enter its registered lower half (e.g. the "destination-half" of D–1—cf. arrows) it will "flare" out around wire PW a prescribed diameter "$F_d$." Diameter $F_d$ depends upon bore diameter (D–1), fluid flow-rate and viscosity, wire diameter, center-hole diameter (CH) and the like. Downstream of this, the flow will exit into the corresponding lower groove (G) and thence be directed to exit from cell 1 at one end thereof. Preferably, the fluid continues down and out of jacket ends DCO, UCO through notches DG, UG respectively therein, to be recirculated from the plating vessel.

The above construction (e.g. per Table III) is primarily, propaedeutic and may be adjusted within the scope of the claimed invention, as understood by those skilled in the art. For instance, the overall size of plating cell 1 (length and diameter) are indicated as being rather close to what is accepted as conventional in this art. However, they may, of course, be modified, for instance, the cell being lengthened and thickened with its other dimensions, such as spacings, etc., being adjusted accordingly. Thus, for instance, cell 1 might be elongated somewhat beyond one inch to include nine, ten or even more side holes SH, of relatively the same size, spacing, etc. as that indicated, however. Further, such things as flow rate, etc. would likely have to be adjusted accordingly from the jacket J modified accordingly, as will be understood in the art.

HOLE DIAMETERS

The diameter of center-hole CH was found (in these examples), according to a feature of the invention, to have some definite limits. Of course, it should be much larger than the wire diameter (which is drawn continuously therethrough) to surround it concentrically, for instance, preferably being about six to eight times that of the 5 mil wire, as indicated in Table IV. As a rough initial test, it was found with a 6-hole cell having 35 mil side bores, that varying center-hole diameter from 20–60 mils gave optimum plating (magnetic properties) at from about 28–42 mil. For instance, for the case of a five mil wire and with side-holes SH about 36 (±3) mils, it was found, as before indicated; first, that the CH diameter can be too small and thus prevent an even laminar flow (about 25 mils or less at indicated bath weight); and second, that it can be too large so as to not properly entrain the laminar circumferential flow transverse the wire or to allow heating of the electrolyte adjacent the wire (degrades plating) at these "fast" conditions, e.g. 50 mils or greater.

It was also found that "good" electroplating under the indicated conditions resulted only when the ratio of center-hole diameter to side-hole diameter (*C/S*) was approximately 1.0 (range 0.8 to 1.2). That is, using cells with a constant center-hole-diameter of 35 mils while varying (six) side-hole diameters from 28–42 mils, it was found that electroplating was optimum at *C/S*=1 and was unacceptably poor when the ratio dropped below about 0.6 to 0.8; and similarly, poor when it rose above about 1.2 to 1.5. These diameter dimensions and ratios are reflected in Table IV where for *C/S*=1.0. In Table IV the (identical) CH and SH diameters were varied, keeping the other plating parameters (electrolyte and plating conditions of bath A and Tables I, II, III) constant to determine the optimum diameter range for such plating conditions.

TABLE IV.—HOLE DIAMETERS (MILS)

| SH, CH [1]: | Magnetic (plate) characteristics [2] |
|---|---|
| 25 | Poor. |
| 28 | Fair. |
| 30 | Fair-good. |
| 32 | Very good. |
| 34 | Excellent. |
| 36 | Excellent. |
| 38–39 | Excellent. |
| 41–42 | Fair-good. |
| 50 | Poor. |

[1] Identical diameters for side bores (SH) and center hole (CH).

[2] Plating generally according to bath A (sp. grav. 1.190) and Table I; cell construction per Table III.

The foregoing plating/hole-diameter relations were also investigated with a modified (sulfamate) electrolyte (e.g.

having a lower specific gravity of 1.16—everything else the same). In this case, the results were much poorer at CH, SH: 38–39 and 41–42. It is also believed that bath gravity and viscosity affect flow "flare," which would be expected to be somewhat greater for the lower gravity bath, thus degrading plating uniformity somewhat.

It will be apparent from Table IV and elsewhere that there is a definite optimum range of center hole/side hole diameters for a given plating set-up; here, being approximately 36 (±3) mils and being 34 (±2) mils for the aforementioned "lighter" electrolyte. One possible explanation for this dimensional criticality is analogous to the explanation for the criticality of the absolute center hole dimension—namely too large a diameter gives insufficient "entraining"; whereas too small a diameter does not properly maintain and dissipate the "depletion layer" at constant thickness thereby introducing areas of nickel-rich and iron-rich plating, instead of zero magnetostriction plating.

SIDE BORE SPACING

As indicated in FIG. 2 and elsewhere, it was also found important, according to another feature of the invention, for a given prescribed set of plating conditions and a given cell structure including dimensions of side-bores SH, to specify a corresponding uniform side-bore (center-to-center) spacing A, which for the indicated case was found to be about 100 mils. In investigating the limits of spacing A, with center hole and side bore (identical) diameters of 36 mils and with the other conditions of the subject plating example (e.g. L, about 880 mils, etc.), it was found that below a bore-spacing A of about 80 mils and above about 125 mils, plating was unacceptable (for this memory application). It is theorized that if spacing A is too small (so that, for instance, side holes SH staggeringly overlap), this acts to (evidently) radically vary the flow mode and vary Fe concentration (during extended plating). Evidently, excessive agitation is generated, only in certain portions along center-hole CH, so that Fe deposition is formed in those portions. This condition will vary the plated alloy composition plating from spot to spot along the wire. Also selective depletion of iron can become a virtually insoluble problem.

A related dimensional constraint, according to another feature of the invention, was found to reside in providing a prescribed range of inter-bore spacings (gaps) *g*. In general, gaps *g* should be adjusted to provide a substantially continuous and uniform "substantially-transverse-only" agitation flow along plating length PL, with neither an overlapping of the transverse (side-bore) flow, nor an interruption thereof to any substantial degree. It is believed that gap *g* helps to accommodate the aforedescribed "flare-out" ($F_d$, FIG. 5) of the flow down the side bores (SH). As schematically and sectionally indicated in FIG. 5 for one aligned set of side bores SH–1, SH–2, as this flow enters center hole CH and envelops wire (splits) PW, it might tend to interrupt an "adjacent-bore-flow" (from a companion side-bore row such as companion bores SH′–1, SH′–2, SH′–3 in plan view) and introduce turbulence. At the other extreme, if gap *g* is too great, spacing interruptions between adjacent "bore-flows" might leave a section of wire PW (along PL) not "covered" by a uniform, purely-transverse, flow. To obviate such longitudinal "flow-discontinuities," gap *g* may be set to almost exactly compensate for flare $F_d$, yet leave little or no "flow-gap" so that the transverse (staggered) side-bore flow pattern is uniform and almost contiguous. In respect of this criticality, it was also noted that this gap *g* (and associated flare $F_d$) evidently varies with the CH, SH diameters as may be inferred from Table V below, where plating results are compared with gap size.

TABLE V.—INTER-HOLE GAP (*g*)—(BETWEEN ALIGNED HOLES SH

| Diameter (mils) of SH and CH | Gap (g.) mils | Plating results |
|---|---|---|
| 50 | 0 | Not satisfactory. |
| 42 | 8 | Satisfactory or better. |
| 38 | 12 | Do. |
| 35 | 15 | Do. |
| 33 | 17 | Do. |
| 32 | 18 | Do. |
| 30 | 20 | Do. |
| 28 | 22 | Do. |
| 35 | 28 | Not satisfactory. |
| 30 | 75 | Do. |
| Case: | | |
| a 45 | 45 | Do. |
| b 35 | 27 | Do. |

NOTE:
Conditions—Otherwise per Bath A, Tables I, II, III; except in Case "a" only 6 holes were used over 800 mil PL and in Case "b" 6 holes on 125 mil centers.
Conclusion—For this type plating, keep gap *g* within the range of from abont 1-8 mils to about 22–24 mils.

It will be apparent from Table V that as inter-hole gap *g* increases, it produces unsatisfactory plating at a certain point (here about 28 mils for the prescribed cell structure and plating conditions). It was also observed that too small a gap *g* (such as 0 mil—cf. flow overlap) likewise produces very unsatisfactory plating. Thus, it is inferred that at least a nominal gap *g* must exist between side holes SH (evidently to accommodate the "flare"), but not substantially more (not more than 10 to 20 mils more) for these conditions, lest a substantial "agitation-flow-discontinuity" be introduced along plating segment PL. Optimization of exact gap *g* is also dependent slightly on viscosity and flow rate of solution (especially since these influence flare). The outer limits of gap *g* dimensions indicated in Table V were corroborated with a six-hole version of the cell (which was otherwise substantially the same as cell 1 above, that is, the plating length PL was the same, etc.). With this "low side-bore density" cell, where identical side-hole/center-hole diameters were 30 and 45 mils and where the resultant gap dimension approximated 75 and 45 mils respectively (spacing A being about 125 mils here), plating was entirely unsatisfactory. It is apparent that this was too wide a spacing (A) and presumably too long an "agitation-interruption" (permitting some non-transverse or longitudinal flow) as well as transverse flow to give satisfactory plating.

To summarize, cell 1 is specified to have a center-hole diameter within a prescribed range, related to the given wire diameter, plating rate (consequent flow rate), etc. This, in turn, fixes the side-bore diameter range (as approximately the same). Then, the side-bore (uniform) spacing must be set so as to keep the (successive-bore) inter-gap *g* within a prescribed range to provide closely adjacent, but not interfering, bore flow. As suggested above, it is believed that too large a gap *g* allows substantail discontinuities in bore-flow (along the plating length PL) varying flow direction (zones of flow parallel to W—W introduced); rate and constancy will be turbulent and otherwise change at times. The invention provides a constant varying flow along PL. Apparently, flow variation upsets electrolyte concentrations adjacent the substrate (in the "cathode double layer"). The relative concentration of ions in this layer will control their deposition rate, this being effected by diffusion and depletion there. The prescribed normal/circumferentially-split flow is believed better for inducing proper pair ordering of Ni-Fe atoms and providing desired magnetic characteristics.

A plated magnetic film composition will typically be checked for magnetic properties by several techniques. One such technique is a magnetostriction measurement, such as by the "Belson method," wherein a torsional stress is placed on the wire and the sense and magnitude of the induced "skew" taken as a measure of the deviation of the average film composition from a "zero-magnetostriction" alloy. Plating conditions may then be adjusted responsively until the magnetostriction is as close to zero as possible (generally corresponding to a composition of about 80 Ni/20 Fe. Bath chemistry is used to control plating composition and nickel or iron source ions are added to the bath as required.

The magnetic properties are tested both to predict performance under the desired magnetic memory operations as well as for quality control of the plating. For instance, such values as "dispersion," "skew" and anisotropy field" are commonly used. Of even more interest are the: "*bit writing current*," that is, the current producing the "easy direction field," as needed to switch 90% of the available flux at a particular value of "hard-direction" writing fields and the "*bit disturb current*," that is, the current with zero transverse field, that reduces the 90% written-in bit to 80% of full flux upon application of 100 "disturbs" (assuming a 5 mil diameter wire, 1 ma.=.0320 oe.).

In summary, it will be understood by those skilled in the art that the foregoing relates to improved cell structures for electroplating thin magnetic cylindrical memory films (especially destructive read-out (DRO) Permalloy wire memory, or the like), especially adapted for high agitation, high current density continuous plating conditions. For instance, when plated as aforedescribed a magnetic Permalloy film electroplated on a wire exhibits the required magnetic properties, such as combined high magnetic readout and low (adjacent-bit) disturb sensitivity.

It will be apparent to those skilled in the art that the principles of the present invention may be applied to different embodiments other than those referred to; for instance, to other analogous substrates and other like electrolytes for improving the magnetic properties of the plated films. While in accordance with the provisions of the patent statutes, there have been illustrated and described the best forms of the invention known, it will be apparent to those skilled in the art that changes may be made in the elements prescribed, the conditions described, or the processes disclosed without departing from the spirit of the invention as set forth in the appended claims; and that, in some cases, certain features of the invention may be used to advantage without a corresponding use of other features.

What is claimed is:

1. A device for electroplating thin magnetic films onto cylindrical substrates under continuous, "fast," high yield plating conditions, said device being adapted to be fed electrolyte by an injection system at a prescribed injection rate and to distribute it uniformly onto said substrate, said device including:

cell means for carrying a cylindrical substrate, said cell means including a channel of cylindrical cross section sufficiently enlarged to allow copassage of the electrolyte with said substrate;

said cell means having a plurality of input conduits along the channel length and extending therefrom, said conduits arranged to form at least two staggered rows of conduits orthogonal to said channel, said conduits being spaced uniformly along a respective row and alternated evenly between rows so as to direct the electrolyte flow substantially normal upon said substrate and substantially continuously and uniformly along the channel length to thereby plate said film with a high degree of uniformity; and a plurality of exit conduits radially aligned with said input conduits so as to increase radial flow and to minimize longitudinal flow.

2. The combination as recited in claim 1 together, with means for moving said substrate continuously through said cell at a prescribed transport speed.

3. The combination as recited in claim 2 wherein all said input conduits along a respective row are uniformly spaced so that the interconduit gap between successive staggered input conduits along the channel length is sufficient to render the individual flows issuing from adjacent input conduits contiguous, without being interferring.

4. The combination as recited in claim 3 wherein said conduits have cylindrical cross sections of equal diameter.

5. The combination as recited in claim 4 wherein the diameter of said conduits is large enough to provide sufficient flow about said wire to prevent "depletion" and to avoid blockage while not being so large as to raise the flow rate sufficiently to favor ion deposition unduly; wherein said channel diameter is in excess of the interconduit gap distance so as to maximize flow radial to said substrate while minimizing flow axial thereto.

6. The combination as recited in claim 5 wherein the common conduit diameter is approximately equal to the diameter of the channel and wherein the inter-conduit gap distance is such as to maximize circumferential flow about said wire and minimize flow axial thereto.

7. The combination as recited in claim 6 wherein said channel diameter and conduit diameters are on the order of approximately 28 to 42 mils and are within 10% of one another.

8. The combination as recited in claim 7 wherein said gap distance is in the range of from about 1 to 24 mils.

9. The combination as recited in claim 8 wherein said channel diameter and conduit diameters are on the order of about 36 mils (±3).

10. A device for the electrolytic treatment of a wire, said device comprising:

cell means for carrying said wire, said cell means including a channel to allow co-passage of an electrolyte with said wire;

said cell means having a plurality of input conduits along the channel length and extending uniformly therefrom to direct the flow of the electrolyte toward and then around the wire within the channel; and a plurality of exit means, at least a portion of each being radially aligned with said input conduits so as to increase radial flow and to minimize longitudinal flow and so as to effectuate a uniform electrolytic treatment of said wire.

11. The combination as recited in claim 10 together with means for continuously moving said wire through said cell at a prescribed transport speed.

References Cited

UNITED STATES PATENTS

| | | | |
|---|---|---|---|
| 2,165,027 | 7/1939 | Bitter | 204—12 |
| 2,370,973 | 3/1945 | Lang | 204—28 |
| 2,395,437 | 2/1946 | Venable | 204—206 |
| 2,445,372 | 7/1948 | Trenbath | 204—28 |
| 2,695,269 | 11/1954 | De Witz et al. | 204—206 |
| 3,441,494 | 4/1969 | Oshima et al. | 204—211 |

JOHN H. MACK, Primary Examiner

T. TUFARIELLO, Assistant Examiner

U.S. Cl. X.R.

204—28, 275